United States Patent
Baughman et al.

(10) Patent No.: US 11,604,979 B2
(45) Date of Patent: Mar. 14, 2023

(54) DETECTING NEGATIVE EXPERIENCES IN COMPUTER-IMPLEMENTED ENVIRONMENTS

(71) Applicant: International Business Machines Corporation, Armonk, NY (US)

(72) Inventors: Aaron K. Baughman, Silver Spring, MD (US); Stephen C. Hammer, Marietta, GA (US); Micah Forster, Austin, TX (US); Hernan A. Cunico, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 1227 days.

(21) Appl. No.: 15/889,399

(22) Filed: Feb. 6, 2018

(65) Prior Publication Data
US 2019/0244092 A1   Aug. 8, 2019

(51) Int. Cl.
*G06F 40/30* (2020.01)
*G06F 40/35* (2020.01)
*G06N 3/08* (2023.01)
*G06N 7/00* (2023.01)

(52) U.S. Cl.
CPC .............. *G06N 3/08* (2013.01); *G06N 7/005* (2013.01)

(58) Field of Classification Search
CPC ........... G06N 3/08; G06N 7/005; G06N 3/006
USPC ....................................................... 706/1–62
See application file for complete search history.

(56) References Cited

U.S. PATENT DOCUMENTS

| | | | |
|---|---|---|---|
| 9,864,424 B1 * | 1/2018 | Templeton | G07F 7/0886 |
| 10,440,180 B1 * | 10/2019 | Jayapalan | G06N 20/00 |
| 2009/0271342 A1 * | 10/2009 | Eder | G16H 50/50 706/20 |
| 2014/0324879 A1 | 10/2014 | Trease et al. | |
| 2014/0336960 A1 * | 11/2014 | Haghighat-Kashani | H02J 13/0006 702/60 |
| 2015/0016712 A1 | 1/2015 | Rhoads et al. | |
| 2015/0310020 A1 * | 10/2015 | Brav | G06F 40/30 707/730 |
| 2015/0340032 A1 * | 11/2015 | Gruenstein | G06N 3/08 704/232 |

(Continued)

FOREIGN PATENT DOCUMENTS

WO   2008081412 A1   7/2008

OTHER PUBLICATIONS

Manda et al., "Evolution of anatomical concept usage over time: mining 200 years of biodiversity literature", Proceedings of The International Workshop on Semantic Big Data, Article No. 4, May 19, 2017, 6 pages.

(Continued)

*Primary Examiner* — Brandon S Cole
(74) *Attorney, Agent, or Firm* — Peter J. Edwards

(57) ABSTRACT

A processor may monitor frequency data related to a user metric of a user during a measurement window. The user metric may relate to the user's use of a computer implemented environment. The processor may simplify the frequency data related to the user metric, resulting in a set of simplified frequency data. The processor may input the set of simplified frequency data into a neural network. The neural network may determine a likelihood of a negative user experience for the user. The processor may alter a parameter of the first user environment based on the likelihood.

18 Claims, 7 Drawing Sheets

(56) References Cited

U.S. PATENT DOCUMENTS

| | | | |
|---|---|---|---|
| 2016/0035132 A1* | 2/2016 | Shuster | G06T 19/006 |
| | | | 345/633 |
| 2017/0162072 A1 | 6/2017 | Horseman et al. | |
| 2017/0171614 A1 | 6/2017 | el Kaliouby et al. | |
| 2017/0293356 A1 | 10/2017 | Khaderi et al. | |
| 2017/0330586 A1* | 11/2017 | Roblek | G06N 3/0454 |
| 2017/0336861 A1 | 11/2017 | Fateh | |
| 2017/0365101 A1 | 12/2017 | Samec et al. | |
| 2017/0371856 A1* | 12/2017 | Can | G06K 9/3233 |
| 2018/0011854 A1* | 1/2018 | Yi | G06F 16/951 |
| 2018/0165723 A1* | 6/2018 | Wright | G06Q 10/0635 |
| 2019/0034947 A1* | 1/2019 | Rucker | G06Q 30/0201 |

OTHER PUBLICATIONS

Brown et al., "Selective Mapping: A discrete optimization approach to selecting a population subset for use in a high-density genetic mapping project", Proceedings of the eleventh annual ACM-SIAM symposium on Discrete algorithms, Jan. 9-11, 2000, pp. 419-428.
IBM, "Behind the Code: Watson at The Masters", developerWorks TV, Published on Apr. 8, 2017, 2 pages https://www.youtube.com/watch?v=Aua7xIIMdUs.

* cited by examiner

DETECTING NEGATIVE EXPERIENCES IN COMPUTER-IMPLEMENTED ENVIRONMENTS

BACKGROUND

The present disclosure relates to computer-implemented environments, and more specifically, to detecting negative experiences in computer-implemented environments.

Some computer-implemented environments serve large numbers of remote users simultaneously. The ability to accurately determine the likelihood of a current or future negative experience for a particular user of such computer-implemented environments, in real time, is limited by the inability of typical monitoring systems to process sufficient data that is determinative of a negative experience for a user.

SUMMARY

Some embodiments of the present disclosure can be illustrated by a method for predicting the likelihood of negative user experiences in a computer-implemented environment. In the method, a processor may monitor frequency data related to a user metric of a first user during a measurement window. The user metric may be related to the first user's use of the computer-implemented environment. The processor may simplify the frequency data related to the user metric, resulting in a set of simplified frequency data. The processor may then input the set of simplified frequency data into a neural network. The neural network may then determine a likelihood of negative user experience for the first user. The processor may alter, based on the determining, a parameter of the first user environment.

Some embodiments of the present disclosure can also be illustrated by a system comprising a processor and a memory in communication with the processor, the memory containing program instructions that, when executed by the processor, are configured to cause the processor to perform a method for predicting the likelihood of negative user experiences in a computer-implemented environment. The method may comprise monitoring frequency data related to a first user metric of a first user during a measurement window. The first user metric may be related to the first user's use of a computer-implemented environment. The method may further comprise expressing the frequency data related to the first user metric as a first spectrogram. The method may further comprise inputting the first spectrogram into a convolutional neural network. The method may further comprise simplifying, by the convolutional neural network, the frequency data related to the first user metric, resulting in a first set of simplified frequency data. The method may further comprise inputting the first set of simplified frequency data into a predictive neural network. The method may further comprise determining, by the predictive neural network and based on the first set of simplified frequency data, a likelihood of a negative user experience for the first user. The method may further comprise altering, based on the likelihood, a parameter of the first user environment.

Some embodiments of the present disclosure can also be illustrated by a computer program product comprising a computer readable storage medium having program instructions embodied therewith, the program instructions executable by a computer to cause the computer to predict the likelihood of negative user experiences in a computer-implemented environment. The compute may monitor frequency data related to a first user metric of a first user during a first measurement window. The first user metric may be related to the first user's use of the computer-implemented environment. The computer may also express the frequency data related to the first user metric as a first spectrogram. The computer may also input the first spectrogram into a first convolutional neural network. The computer may also simplify, by the first convolutional neural network, the frequency data related to the first user metric, resulting in a first set of simplified frequency data. The computer may also input the first set of simplified frequency data into a predictive neural network. The computer may also determine, by the predictive neural network, and based on first set of simplified frequency data, a likelihood of a negative user experience for the first user. The computer may also alter, by the processor and based on the likelihood, a parameter of the first user environment.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
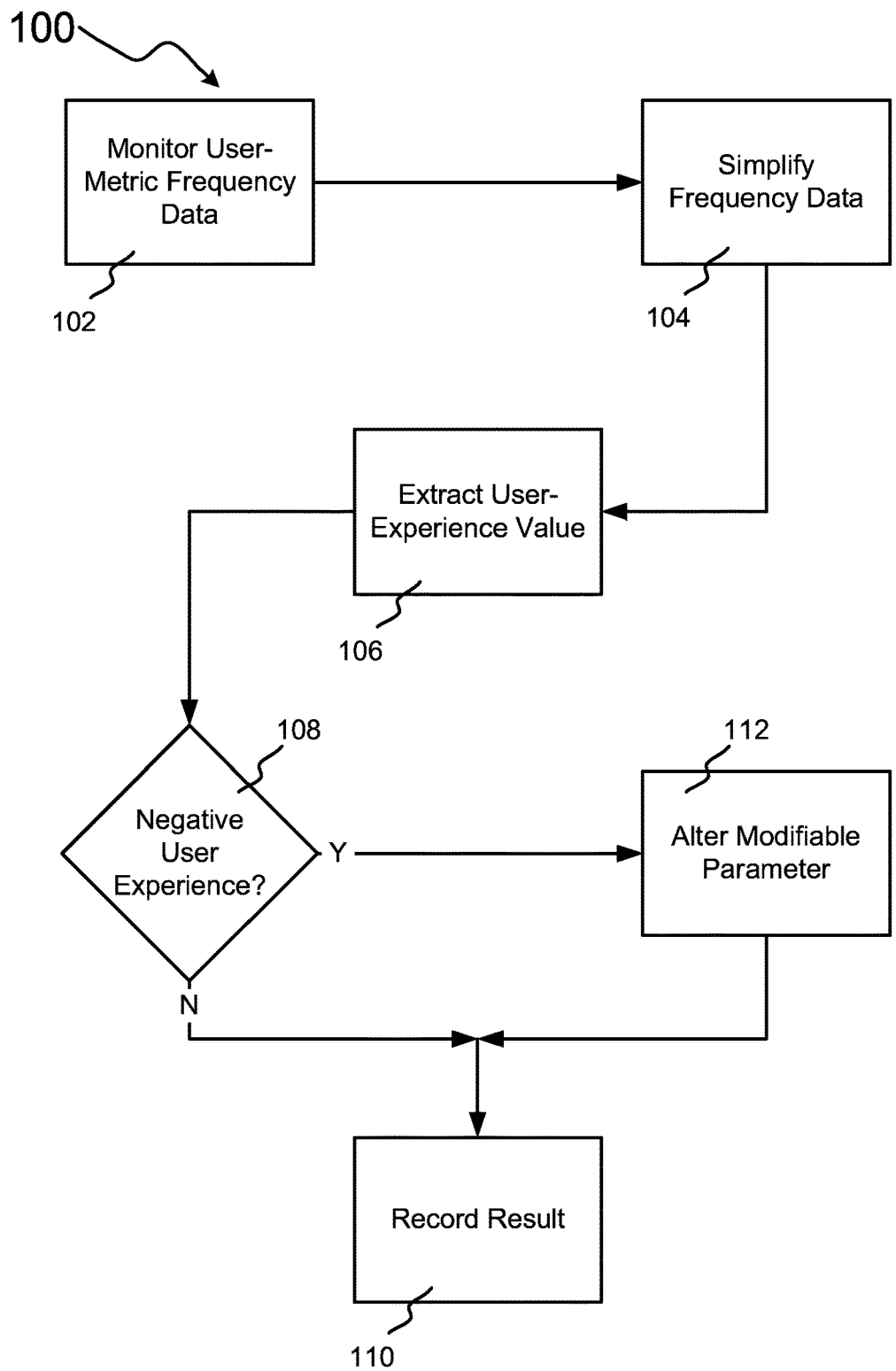
FIG. 1 depicts an example method of predicting a likelihood of and responding to negative user experiences in a computer-implemented environment, in accordance with embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer-implemented environments, more particular aspects relate to automatically controlling computer-implemented environments. While the present disclosure is not necessarily limited to such applications, various aspects of the disclosure may be appreciated through a discussion of various examples using this context.

Some computer-implemented environments benefit by extending the amount of time that users spend in those environments before leaving the environments. For example, some websites offer complimentary content, but profit based on the amount of advertisements a user views while on that website. Similarly, some computer-implemented environments benefit by maximizing the likelihood that users will return to that computer-implemented environment after leaving the environment. For example, an electronic retail environment may profit when users leave to research the offerings of competitive environments, only to return to the original retail environment to purchase goods.

Further, electronic environments such as free-to-use applications (e.g., mobile games) may derive most of their profit from users who visit the environments regularly to make in-application purchases. Other computer-implemented environments may profit by charging users for access to the environments for set amounts of time, such as per minute, per month, or per year. Finally, some computer-implemented environments may only be accessible through specialized computer equipment, such as virtual-reality devices, augmented-reality devices, and cognitive rooms (also referred to as augmented-reality rooms). If users of those computer-implemented environments enjoy the use of those environments, they may be more likely to purchase that specialized hardware or upgrade to new specialized hardware when it becomes available. Manufacturers and retailers of that specialized hardware may, therefore, benefit by maximizing the satisfaction users get out of those computer-implemented environments.

The number of computer-implemented environments that derive a benefit from maintaining positive user experiences has increased recently, as has the extent to which some computer-implemented environments derive a benefit. As a consequence, the importance of identifying, mitigating, and preventing negative user experiences in computer-implemented environments has also increased. A negative user experience in an environment, as used herein, may refer to a past, present, or future experience in that environment that makes a user of the environment more likely to leave the environment, likely to remain in the environment for a shorter amount of time, or less likely to return to the environment in the future. Examples of negative user experiences in a computer-implemented environment include, but are not limited to, a feeling of boredom in the environment, confusion with regards to the properties of the environment, frustration with regard to the stimuli of the environment, and distaste of the aesthetics of the environment.

Unfortunately, the abilities to detect, in real time, that a user of a computer-implemented environment is likely to be having a negative experience and to predict, based on real-time data, that a user will be likely to have a negative experience in the future, are limited. This is partially due to resources dedicated to predicting negative experiences of users being limited, a consequence of the nature of computer-implemented environments. This is a limitation not typically experienced in in-person environments, such as in-person retail environments. For example, in a retail store, there may be, at any given time, a relatively small ratio of customers to salespeople in the store (e.g., five to one). Thus, it is feasible that each salesperson could periodically determine whether it appears that any customer in the store is having a negative experience. For example, by quickly glancing at each customer's body language, facial expression, and walking cadence, a salesperson may intuitively detect whether a customer is having a negative experience in the retail environment. Further, by listening to a particular customer's speech, such as a customer's tone, word choice, or the meaning of the customer's sentences, a salesperson may be able to detect that a customer is having a negative user experience even when visual cues are insufficient.

However, in typical computer-implemented environments, the number of users may be significantly higher than in typical in-person environments. For example, a popular retail website may have several thousands, or even millions, of concurrent visitors. Accurately detecting the likelihood of negative experiences for all such users by the same method as used by the salespeople in the in-person retail example discussed earlier would likely not be feasible. Some retail websites may hire human personnel (referred to in relation to this example as "trackers") to monitor users for potential negative experiences. However, in order for websites with many users to maintain a ratio of trackers to users that is similar to that of the earlier-discussed, relatively small ratio of customers to salespeople, the website may potentially need to hire thousands, or millions, of simultaneous trackers to monitor customers. The cost of employing these trackers may be prohibitively expensive. Further, those trackers may require access to live video and audio footage of each user in order to monitor the facial expressions and speech of the users. Even if this were possible, body-language cues that may be available to in-person salespeople, such as walking patterns and standing posture, may be unavailable to the trackers.

Computer-implemented environments also face unique challenges with regard to mitigation and prevention of negative user experiences. The previously discussed example of an in-person retail environment is also illustrative of these challenges. If, for example, a salesperson of an in-person retail environment detects that a customer is undergoing a negative experience or predicts that a customer soon will be undergoing a negative experience, that salesperson may intervene by approaching that customer and redirecting that customer's attention to something likely to elicit a positive experience. This may include greeting the customer (e.g., shaking the customer's hand or a similar cultural gesture), conversing with the customer (e.g., participating in small talk to make the customer feel more comfortable), highlighting the benefits of a product or service that may be of interest to a customer, or urging the customer to move to an area of the store that may be more likely to elicit a positive experience.

Unlike in-person salespeople, however, hired remote trackers are typically unable to perform in-person intervention. In some instances, no interaction with the user may be possible at all. Thus, computer-implemented environments suffer from significant limitations in mitigating and preventing negative user experiences, even where those negative user experiences may be theoretically detectable or predictable.

In some instances it may be more feasible to utilize computerized trackers rather than hired human trackers in computer-implemented environments. For example, it may be more economically feasible to operate an amount of computer resources that is sufficient to monitor users than it is economically feasible to employ a sufficient number of human trackers. However, computerized trackers also face unique challenges with regard to detecting and predicting the likelihood of negative user experiences. For example, computerized trackers are typically far less efficient and far less accurate at interpreting the subjective information used by human trackers to detect negative user experiences (e.g., user metrics such as facial expressions, body language, tone of voice, natural-language interpretation). Computerized trackers may be capable of recording when a user exits a computer-implemented environment, but are limited in their ability to accurately determine why that user exited the computer-implemented environment; in many instances computerized trackers are unable to accurately determine whether a user exited a computer-implemented environment because of a negative user experience or because of an innocuous reason. Because of the limitations computerized trackers face in interpreting subjective user metrics, computerized trackers also face challenges in accurately identifying the negative user experience that may have caused a user to exit a computer-implemented environment.

Computerized trackers also face unique challenges in detecting and predicting the likelihood of negative user experiences in real time, rather than after the fact. Processing power required for interpretation of subjective metrics is typically quite high, and thus performing computerized tracking of users on a large scale and in real time may be prohibitively expensive in many environments.

In some computer systems, neural networks may be utilized to process information far faster than conventional computer-architecture is able to. Predictive neural networks, for example, may be trained to relatively quickly associate patterns in user-metric information with previously determined outcomes. However, predictive neural networks may also face unique challenges associated with detecting and predicting negative user experiences. For example, neural networks typically must be specifically trained to process information in a particular format, and are limited in the formats they are capable of processing, even with adequate training. Many predictive neural networks may only be capable of processing information in the form of explicit integer values for a defined set of parameters. However, the information that may be useful in detecting or predicting the likelihood of a negative user experience is often highly variable, even when limited to a single particular user. This highly variable information may be natively expressed in equally variable formats, and thus training a neural network to process subjective user-metric information may be difficult.

Further, as the variability of the information input into a neural network increases, the size of the neural network, the amount of training required by the neural network, or both, may also increase significantly. Similarly, as the variability of the information input into a neural network increases, the volume of that information required by the neural network to accurately recognize and associate patterns in that information (in other words, the size of data sets required for pattern recognition among and within those data sets) may also increase. This may also increase the resources required to operate the neural network, as the necessary size of the neural network may also increase as the volume of information to be processed by that neural network increases.

In some embodiments of the present disclosure, user-metric information may be monitored and simplified before being input into a predictive neural network. In some embodiments, this predictive neural network may be trained to recognize patterns in the simplified metric information and associate those patterns with known outcomes related to positive and negative user experiences. By simplifying user-metric information before inputting the information into the predictive neural network, the embodiments of the present disclosure enable neural networks of feasible size, complexity, and cost of operation to accurately predict the likelihood of current and future negative user experiences.

For example, in some embodiments of the present disclosure, the frequency of user-metric patterns (in other words, frequency patterns in metrics derived from the user, such as biometric data) over a period of time may be simplified for input into a neural network. The metrics monitored may include several different types of measurable data that may be relevant to a user's response to a computer-implemented experience. For example, biometric signals (e.g., heart rate, skin temperature, breathing patterns, and amount of sweat), usage data (e.g., interactions with electronic peripherals, such as a computer mouse or augmented reality headset), speech metrics (e.g., words used, tone of voice, speed of diction, volume of speech, and meaning of sentences), or the results of user commands (e.g., navigating between pages on a web site, increasing or decreasing font size, and changing environment settings) may be monitored and analyzed for frequency patterns. The monitored information may then be simplified before being input into a predictive neural network.

For example, a user's heart rate, measured in beats per minute (BPMs) over a period of five minutes may be monitored. The user's heart-rate frequency data may then be simplified by deriving larger-scale patterns of the heart-rate information over that five minute window. For example, the heart-rate frequency data may be simplified by determining how many times each frequency (e.g., 60 beats per minute and 92 beats per minute) or range of frequencies (e.g., between 50 and 80 beats per minute and between 75 and 95 beats per minute) occurred for longer than a given threshold (e.g., 20 seconds). In such an example, the user's heart-rate frequency data may be simplified to a set of values (e.g., 3, 2, and 4, indicating that the user's heart rate fell into the first BPM range 3 times for over 15 seconds, fell into the second BPM range 2 times for over 15 seconds, and fell into the third BPM range 4 times for over 15 seconds). The frequency data may also be simplified, for example, by determining the percentage of the five-minute window that the user's heart rate was at a particular BPM frequency or in a particular frequency range (e.g., at 63 BPM for 8% of the window, or in range 2 for 50% of the window).

Some embodiments of the present disclosure express user-metric frequency data in the form of a spectrogram (e.g., a graph of frequency over time), which are capable of expressing large amounts of user data in a single graph. For example, some spectrograms express the frequency magnitude (e.g., 90 BPM vs 120 BPM for heartrate) on a frequency axis, the time on a time axis, and the amplitude of each frequency for a particular time period with shading (e.g., each point on the graph is shaded darker or lighter based on the percentage that the frequency at that time point is expressed compared to all other frequencies at that time point). Thus, a spectrogram is capable of expressing three dimensions worth of data in a simple two-dimensional image. Further, because frequency is already an expression of two values (e.g., for breathing rate, breaths and the time interval) a spectrogram image of user metrics may be capable of expressing a large amount of user data. Using spectrogram-expressions of user-metric frequency data, then, provides a significant amount of data to be simplified, which may increase the accuracy of predictions made based on the simplification of that data.

However, simplifying the amount of data displayed in a spectrogram may be extremely computationally intensive using many standard computational methods (including many varieties of neural networks). Therefore, simplifying spectrograms in real time, particularly for multiple user metrics simultaneously, may be a very expensive process, requiring extensive resources for processing power and memory (e.g., RAM) support for that processing power. Further, doing so with a significant number of users, each with several metrics being monitored (and each metric for each user producing a unique spectrogram at each time window) may not be possible in real time with many computation methods, even where it is not financially infeasible.

For these reasons, some embodiments of the present disclosure utilize convolutional neural networks to efficiently simplify user-metric frequency data expressed in the form of spectrograms. Convolutional networks are neural networks that, among other things, are particularly well suited to analyze and identify images that typical computer architectures may have very limited capabilities to process. Typical convolutional networks contain a feature-extraction stage and a classification stage. In image processing, the feature-extraction stage simplifies images by extracting the notable features from the images through one or more sets of convolution and pooling layers. The output or outputs of the feature-extraction stage are input into the classification stage, which is comprised of one or more sets of fully connected layers, similar to a classifier neural network. The classification stage functions to classify the image into one or more categories based on the simplified and extracted features. This combination of feature extraction and classification make convolutional neural networks a very efficient method of analyzing images; convolutional neural networks are often able to analyze images faster and with fewer processing and memory resources than other types of neural networks and other processing methods.

Convolutional neural networks utilized by the present disclosure may be trained to analyze user-metric-frequency spectrograms, extracting and simplifying the features of the spectrograms and classifying those extracted, simplified features into one or more simplified values. The simplified user-metric frequency data may then be input to a neural network that has been trained to process that simplified frequency data. The neural network may recognize patterns within the simplified data and associate those patterns with known outcomes of negative or positive user experiences. The output of the neural network may then be utilized in a determination of whether to modify the user experience based on the user-metric frequency data.

Therefore, expressing user input in terms of frequencies, expressing those frequencies in spectrograms, and utilizing the capability of convolutional neural networks to be trained to quickly identify properties of spectrogram images may enable, in some embodiments, the user experiences of computer-implemented environments with large numbers of users to be automatically and accurately monitored in real time. For example, by utilizing convolutional neural networks to simplify frequency data of user metrics for those monitored user experiences, some embodiments of the present disclosure are able to provide predictive neural networks with the data that is necessary to accurately predict the likelihood of negative user experiences far faster than may otherwise be possible, and without the need for financially (and potentially logistically) prohibitive amounts of system resources. Further, this simplified data may be applied for further technical benefits; by quickly simplifying the frequency data into a format that the predictive neural network is trained to process, the convolutional neural network removes a technical bottleneck in accurately predicting whether any user within a large group of users is having, or will have, a negative experience. With the removal of this technical bottleneck, the predictive neural network is able to accurately predict whether a user experience should be changed, in real time, to mitigate or avoid a user having a bad experience. In this way, the embodiments of the present disclosure are able to overcome many unique technical challenges of computer-implemented environments.

FIG. 1 illustrates an example embodiment of a method 100 by which user-metric frequency data is utilized to determine whether a user is undergoing a negative user experience. Method 100 may be beneficial in detecting the likelihood of negative user experiences in a variety of computer-implemented environments. For example, method 100 may be used to monitor and alter the experiences of customers of an online retail website, of users of an augmented-reality device, of users of an augmented-reality room, and others.

In block 102, the metric frequency data for a user of the applicable computer-implemented environment is monitored. In some embodiments, this metric frequency data may be any metric associated with the user that may be expressed as a frequency and that may relate to the user's experience. For example, this metric frequency data may be the user's heart rate, breathing rate, blinking rate, pupil dilation over time, typing rate, speech patterns, and others. In some embodiments, the metric frequency data may be monitored indirectly, such as by measuring the frequency of something derivative of a user metric, such as the results of user input. The result of a user input may be, for example, the frequency with which a user changes a web page (in embodiments in which the environment is a website, for example), the frequency with which a request is received from the user (e.g., a request for a hint in a mobile game), or the frequency with which the user changes the content presented in an environment (e.g., a command to skip to the next song, video, or image, where the environment is a service that provides the user with particular songs, videos, or images according to an algorithm).

In some embodiments this metric frequency data may be utilized as raw data (e.g., numbers in a .CSV file), whereas in other embodiments this metric frequency data may be utilized as a visual graph. For example, in some embodiments the metric frequency data may be expressed as a spectrogram. In such embodiments, each user metric may have a separate spectrogram (e.g., a first spectrogram may be compiled for heart-rate data, a second spectrogram may be compiled for breathing-rate data, and a third spectrogram may be compiled for data relating to mouse clicks per second). Further, each spectrogram may display metric data for a specified time window (e.g., a 5-minute window), and each time window for each metric may be expressed in a separate spectrogram (e.g., a frequency patterns for a first metric may be expressed in a first spectrogram between 0 minutes and 2 minutes, and a second spectrogram may express the first metric between 2 minutes and 4 minutes).

In block 104, the frequency data for each metric is simplified to facilitate processing by a neural network. For example, in some embodiments the frequency data may be simplified to a particular format, such as a value or set of values. In such embodiments, each metric for each measurement window may be simplified to one or more values that represent properties of the frequency data in that window for that metric. For example, a frequency data pertinent to the user's rate of blinking may be simplified to a maximum rate of blinking over a threshold period of time during that measurement window (e.g., 1.5 blinks per second over a 5-second period in a 4-minute measurement window), which may be input to a neural network as the maximum-rate value (e.g., 1.5).

In some embodiments, frequency data may be simplified by a convolutional neural network that is trained to recognize patterns in images. Such a convolutional neural network may be trained to process spectrogram images of user-metric frequency data, for example. In these embodiments, the spectrogram files (e.g., .jpeg, .pdf, .tiff files) pertaining to a user's metrics over a period of time may be input into a convolutional neural network. For example, at the end of a measurement window, one spectrogram for each monitored user metric may be input into a convolutional neural network. This convolutional neural network may identify patterns in those spectrograms, such as maximum frequency over a measurement window, number of changes in frequency over a measurement window, average frequency over a measurement window, number of instances of each frequency (or frequency range) over a measurement window, or others. The convolutional neural network may, for each spectrogram, output a value that reflects the simplified data for the frequency data pertaining to the metric for that spectrogram.

In some embodiments, multiple convolutional neural networks may be utilized to process spectrograms that express user-metric frequency data. For example, in some embodiments it may be beneficial to train a separate convolutional neural network for each user metric being monitored (e.g., a first convolutional neural network to process skin-temperature spectrograms and a second convolutional network to process typing-speed spectrograms). In this way, each convolutional neural network may be specialized to detect image patterns particular to a specific metric, and may function more effectively.

In block 106, the simplified metric frequency data is compiled, and a user-experience value is extracted from the compiled data. In some embodiments, this may include recognizing patterns in the simplified frequency data and associating those patterns with known positive or negative user experiences. For example, in some embodiments the simplified frequency data may take the form of integer or decimal values that may be combined into a vector and input into a predictive neural network. This predictive neural network may be trained to process the vector, recognize patterns in the values therein (or patterns in the combination of the values of one vector and a second vector), and associate those patterns with training data in which it was known whether the user was undergoing a positive or negative user experience. The predictive neural network may then output a value that expresses the likelihood that the user is undergoing a negative user experience. In some embodiments, the predictive neural network may output two values: a first value that expresses the likelihood that the user is undergoing a negative user experience, and a second value that expresses the likelihood that the user is not undergoing a negative user experience.

For example, at the end of each measurement window, one or more convolutional neural networks may process metric-frequency spectrograms and output a value or set of values that expresses the simplified frequency data for the spectrogram or spectrograms input into that or those convolutional neural networks. These values may then be amalgamated into a vector and input into the first layer of a predictive neural network. In some embodiments, this process may be repeated for each measurement window, such that the predictive neural network outputs an updated likelihood of a negative user experience for each measurement window. In other embodiments, the input vectors may be combined, such that the neural network outputs a likelihood of a negative user experience less frequently (e.g., every other measurement window).

In some embodiments, the predictive neural network may be trained to extract user-experience values that express the likelihood that a user is currently undergoing a negative user experience. This may be beneficial, for example, for mitigating negative user experiences that a user is currently undergoing before the negative effects of those experiences become irreversible (e.g., before the user leaves the environment or decides to not return to the environment at a later date). However, in some embodiments the predictive neural network may be trained to extract user-experience values that express the likelihood that a user is likely to undergo a negative user experience at some point in the future. This may be beneficial, for example, for preventing negative user experiences that a user may have in the user environment if the environment is not changed (e.g., preventing the user from getting bored or frustrated with the environment).

Whether a neural network is trained to predict, for example, whether a user is likely to be currently undergoing a negative user experience, whether a user is likely to undergo a negative user experience in the near future, or whether a user is likely to undergo a negative user experience in the far future, may depend on the patterns in the simplified frequency data that the neural network has been conditioned to recognize, and the conclusions that the neural network is conditioned to draw once it has recognized a pattern. For example, the frequency patterns of a user metric (e.g., skin temperature, iris diameter) may exhibit a first pattern when a user (e.g., a particular users, any user from a set consisting of several users) is currently undergoing a negative experience, but may exhibit a very different pattern when a user is currently not undergoing a negative experience, but likely to undergo a negative experience in a few minutes. In some embodiments, a neural network that is trained to recognize the first pattern may not be trained to recognize the second pattern.

Further, a neural network that is trained to recognize the first pattern may associate that pattern with a current negative experience because human designers of the neural network may have provided the neural network with a training dataset that included known instances of current negative experiences that also exhibited that pattern. Even if a second neural network did recognize the first pattern, the second neural network may be prevented (deliberately or otherwise) from outputting a conclusion based on that pattern if the second neural network is not trained to associate that first pattern with a known instance of a negative experience. In this way, separate neural networks may be trained to predict the likelihood that a user will undergo a negative experience at separate times. In some embodiments, this concept may be extended to predicting a likelihood of a negative experience to any present of future time, or any condition, for which a unique pattern of user-metric frequency data is associated.

For example, users may exhibit a first heart-rate pattern when the user is currently undergoing a negative experience, a second heart-rate pattern when the user is likely to undergo a negative experience in ten minutes (provided that parameters are not changed), and a third heart-rate pattern when the user is likely to undergo a negative experience the next time the user views the "welcome" message in an environment. With appropriate training of a neural network or networks, each of these patterns may be independently recognized and independently associated with the appropriate prediction.

In some embodiments, a neural network may be trained to output values that express both the likelihood that a user is currently undergoing a negative user experience and the likelihood that a user will undergo a negative user experience at one or more points the future. In other embodiments, multiple neural networks may be utilized, each configured to output a value or values that express the likelihood that a user is undergoing or will undergo a negative user experience at a particular time. For example, a single neural network, or a set of multiple neural networks, could predict the likelihood that a user is currently undergoing a negative user experience, that a user will undergo a negative user experience in the next 30 seconds, that the user will undergo a negative user experience in the next 5 minutes, and that the user will undergo a negative user experience upon the occurrence of a future event (e.g., the next time the user logs on to a web site portal or initiates an augmented-reality experience).

The simplified frequency data is processed to determine whether the user is likely to be undergoing a negative experience, or likely to undergo a negative user experience in the future, in block 108. In some embodiments this may involve comparing the value (or values) output by the neural network (or neural networks) in block 106 with a threshold value. For example, a neural network may output a user-experience value of 0.4 in block 106, indicating a 40% likelihood that a user is currently undergoing a negative user experience. If this value is compared to a negative-experience threshold value of 0.5 in block 108, it may be determined that the user is not sufficiently likely to be undergoing a negative user experience. However, if this value is compared to a negative-experience threshold value of 0.39, it may be determined that the user is sufficiently likely to be undergoing a negative user experience.

In some embodiments, the threshold value to which the user-experience value is compared may vary based on the conditions of the environment and the prediction. For example, in environments that are particularly sensitive to users negatively reacting to negative user experiences, a low negative-experience threshold may be set. Further, predictions related to whether a user is currently undergoing a negative user experience may be more urgent than predictions related to whether a user is likely to undergo a negative user experience in the future. Thus, a negative-experience threshold for the same environment may be lower when compared to user-experience values that reflect a user's current experience than when compared to user-experience values that reflect a user's future experience. For example, for a particular environment, a negative-experience threshold may be 0.4 for user-experience values that express a likelihood that a user is currently undergoing a negative user experience. However, for the same environment, a negative-experience threshold 0.6 for user-experience values that express a likelihood that a user will undergo a negative user experience in one minute, and 0.8 for user-experience values that express a likelihood that a user will undergo a negative user experience in 10 minutes.

Thus, in embodiments in which multiple user-experience values that correspond to multiple points in time are extracted, multiple experience thresholds may also be utilized. Establishing different negative-experience thresholds for predictions relevant to different points in time may, for example, reflect the potential for user conditions to change naturally between the present and the point in time that corresponds to a future prediction or reflect the reduced urgency of preventing experiences that are far in the future rather than near in the future or in the present.

If it is determined in block 108 that a negative user experience is not likely (e.g., the user-experience value extracted in block 106 is determined in block 108 to be below, or, in some cases, above, a relevant threshold), the result of the analysis is recorded in block 110. Recording the results of the analysis may, for example, be useful in training neural networks to more accurately process simplified metric frequency data in the future. In some embodiments, this may involve recording the results of block 108. In other embodiments, this may involve recording the results of block 106, or block 104. In some other embodiments, the results of blocks 104, 106, and 108 may all be recorded for future use.

If it is determined in block 108 that a negative user experience is likely, the user experience is modified in block 112 by altering a modifiable parameter of the user experience. For example, the colors of a website may be altered, the ambient sounds of a virtual-reality experience may be turned up or turned down, the temperature in an augmented reality environment may be increased or decreased, and others. The modification in block 112 may vary depending on the type of environment and the parameters that are available to be modified within the environment. For example, in environments that consist of a display on a conventional computer display (e.g., a web site being displayed on a consumer laptop computer), parameters such as font size, colors used in the environment (e.g., font color, background color), and sounds played in the environment (e.g., background music, sound effects) may be adjusted. In such environments the parameters of the physical equipment itself may be modifiable parameters. For example, the brightness or contrast of the display may be modifiable, as may be the properties of the speakers (e.g., the volume and equalizer settings) to which the display is connected.

In some embodiments, parameters of the room in which the user is located may be modifiable. For example, in some augmented reality environments, such as environments that include augmented-reality headsets or environments in which the room is equipped to provide an altered-reality experience (e.g., an augmented-reality room with large displays surrounding the user), the lighting of the room may be modifiable, as may be the temperature. In some rooms, direct heat sources, such as space heaters and heat lamps, may be modifiable such that users experience the temperature of an environment that the room is projecting. Some environments may include furniture that may be modifiable (e.g., the chair in which the user is sitting may be capable of moving and vibrating, and may have a heated seat). The airflow around a user may be modifiable, as may be the scent of the air surrounding the user.

In some embodiments, parameters directly affecting the user may be modifiable. For example a user may, as part of a computer-implemented experience, hold an electronic peripheral (e.g., a game controller). In some embodiments, that peripheral may be capable of providing haptic feedback. The type, intensity, sources, frequency, and causes of that haptic feedback being triggered may be modifiable. In those instances, one or more parameters associated with the haptic feedback may be altered in response to a determination in block 108 that a user is likely undergoing or likely to undergo a negative experience.

In some embodiments proprioceptive parameters may also be modifiable. For example, in some augmented-reality or virtual-reality environments, a user may be attached to equipment that is capable of delivering electrical impulses to the user, stimulating the user's nerves. In some such instances, the electrical impulses may be capable of simulating responses to real-world stimuli (e.g., simulating the weight of an object in a user's arms when the user is holding an object in the augmented-reality or virtual-reality environment). In these embodiments, the parameters of the proprioceptive stimuli may be altered in response to a determination in block 108 that a user is likely undergoing or likely to undergo a negative experience.

In some embodiments, the alteration of a modifiable parameter in block 112 may not occur immediately. For example, in some embodiments a determination may be made to alter a modifiable parameter in the future, before a predicted negative experience occurs (e.g., if a negative experience is predicted to occur in 5 minutes, a determination may be made to modify a parameter in 4 minutes). In some instances, it may be predicted that a user is currently undergoing a negative experience, but that it is too late to mitigate the negative experience (e.g., a user may have had a negative reaction to a transition effect between two displays in a computer program, but the transition effect may have concluded). In those instances, a determination may be made to modify the applicable parameters to avoid the negative experience in the future (e.g., the transition effect between two static environments may be tweaked or replaced with a different transition effect the next time the user transitions between two displays).

In some embodiments, multiple parameters may be modified (or determined to be modified) in block 112. In other embodiments only a single parameter may be modified. Similarly, in some embodiments parameters relating to multiple aspects of the environment may be modified (e.g., lighting of the room, haptic feedback, and colors on a website), whereas in other embodiments only parameters relating to a single aspect of the environment may be modified (e.g., only speaker volume and pitch, only font size and color, only temperature of the room).

Once parameters have been modified in block 112 (or a determination has made to modify the parameters), a result is recorded in block 110. In some embodiments, this may involve recording the monitored user reaction to the altered parameters (e.g., through further iterations of blocks 102 through 108). In some embodiments, recorded results may be utilized for further neural-network training. In some instances, monitoring and recording the results may result in a further negative user experience being identified in a further iteration of block 108. In such instances, the parameters that were altered in block 112 may be altered again in a further iteration of block 112. For example, in some instances the second iteration of blocks 106 and 108 may indicate an improvement in the user experience, but the experience may still be a negative user experience. In those instances, the altered parameters may be altered even further (e.g., if decreasing the brightness of lights in the room caused a slight increase in the user experience, the brightness of the lights in the room may be further decreased. Alternatively, in some instances the second iteration of blocks 106 and 108 may indicate a further deterioration of the user experience. In those instances, the altered parameters may be restored to their pre-altered state, or may be reversed (e.g., if decreasing the brightness of the lights in the room caused a decrease in the user experience, the brightness of the lights in the room may be increased to their original value or past the original value).

Figure 2:
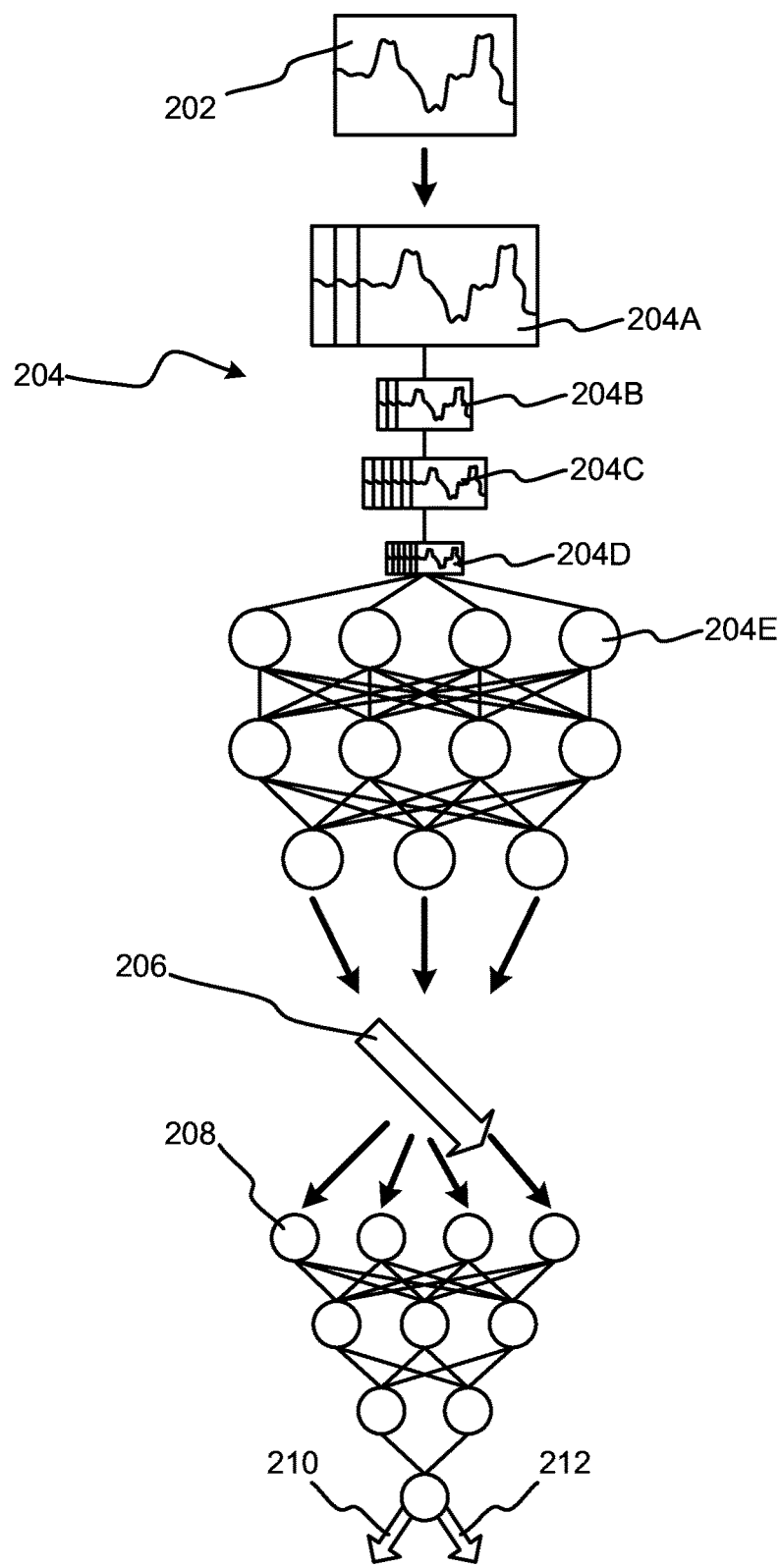
FIG. 2 illustrates an example graphical illustration of the components involved in the extraction of a user-experience value, in accordance with embodiments.

FIG. 2 illustrates an example graphical illustration the components involved in the extraction of a user-experience value. In FIG. 2, spectrogram 202 is created from monitored user-metric frequency data. In some embodiments, spectrogram 202 expresses frequency data of a user metric for a user in a computer-implemented environment over a measurement window (e.g., frequency data of mouse movements over a 10-minute window for a user who is logged in to a retail website, frequency of web-page refreshes). In some embodiments, the user-metric frequency data is be simplified by inputting spectrogram 202 (e.g., a .jpg file of the spectrogram) into convolutional neural network 204. Convolutional neural network 204 may be comprised of a feature-extraction section and a classification section. The feature-extraction section, as illustrated here, comprises convolutional layer 204A, pooling layer 204B, second convolutional layer 204C, and second pooling layer 204D. In some embodiments, convolutional layers 204A and 204C may comprise one or more image filters, and may include a non-linear function, such as a ranh, sigmoid, or ReLU function. Convolutional layers 204A and 204C may extract features from spectrogram images. Pooling layers 204B and 204D may utilize one of multiple types of pooling, such as max pooling, average pooling, sum pooling, and others. Pooling layers 204B and 204D may simplify (e.g., downsample) images extracted by convolutional layers 204A and 204C respectively. While, as illustrated, convolutional network 204 contains two convolutional layers and two pooling layers, in some embodiments convolutional network 204 may only be comprised of one convolutional later and one pooling layer. In other embodiments, convolutional network 204 may be comprised of more than two convolutional layers and more than two pooling layers.

The output of the feature-extraction section provides input to the classification section 204E. In classification section 204E, each circle represents a neuron or group of neurons, and each horizontal row of circles represents a layer or neurons. Classification section 204E is depicted with two hidden layers of four neurons and an output layer of three neurons. However, in some embodiments different configurations of neurons may be used in classification section 204E. For example, classification section 204E may be implemented with more layers of neurons than are presented here, or fewer layers of neurons than are presented here. Further, any layer of classification section 204E may contain more or fewer neurons than are presented here.

Convolutional neural network 204 may be trained to process spectrogram images specifically expressing frequency data for only one metric and one measurement-window length (e.g., mouse movements over 10-minute windows). In other embodiments, convolutional neural network 204 may be trained to process spectrogram images for multiple metrics, and multiple measurement-window lengths.

The output layer of convolutional neural network 204 may be one of more simplified frequency data values. These values may be amalgamated into a vector 206. In some embodiments, vector 206 is composed entirely of values output from convolutional neural network 204. This may be useful, for example, in instances in which convolutional neural network 204 is trained to process spectrogram images for multiple user metrics. However, in other embodiments, the output values of other convolutional neural networks (e.g., convolutional neural networks that are trained to process spectrogram images for other metrics) may be amalgamated with the output values of convolutional neural network 204 and in vector 206. This may be useful, for example, in instances in which convolutional neural network 204 is only trained to process spectrogram images for a single user metric. In these instances, other convolutional neural networks may analyze spectrogram images for other monitored user metrics.

Vector 206 is input into the input layer of neural network 208. In neural network 208, each circle represents a neuron or group of neurons, and each horizontal row of circles represents a layer or neurons. Neural network 208 is depicted with an input layer of four neurons and an output layer of one neuron, and two hidden layers of neurons. However, in some embodiments different configurations of neural network 208 may be used. For example, neural network 208 may be implemented with more layers of neurons than are presented here, or fewer layers of neurons than are presented here. Further, any layer of neural network 208 may contain more or fewer neurons than are presented here.

Neural network 208 may be a predictive neural network that is trained to process the simplified frequency data pertaining to a set of user metrics and output a value that represents a likelihood that the user is undergoing, or will undergo, a negative user experience. Neural network 208 may identify patterns in the simplified frequency data and associate those patterns with previous simplified-frequency-data patterns that are known to be correlated with positive or negative user experiences. In some instances, the patterns derived from a single measurement window (or, in some embodiments, a single set of spectrograms) may be sufficient for this association. In other instances, neural network 208 may utilize patterns that span several measurement windows.

As discussed, in some embodiments vector 206 may contain the output values of the analyses of spectrogram images pertaining to several monitored user metrics. This would effectively combine the simplified frequency data for those multiple user metrics in one vector. This would enable neural network 208 to analyze the simplified frequency data for multiple user metrics in relation to each other. For example, in some instances the patterns in the simplified frequency data for a user's heartrate may be associated with patterns that would normally imply the user is undergoing a negative user experience (e.g., that the user is frustrated). However, when those patterns occur in relation to patterns in the simplified frequency data for a user's eye gaze, it may actually imply that the user is undergoing a positive user experience (e.g., that the user is excited, rather than frustrated). Thus, in some embodiments, neural network 208 may be trained to consider combinations of multiple patterns of simplified frequency data for multiple user metrics.

Neural network 208 outputs likelihood values 210 and 212. In some embodiments, likelihood values 210 and 212 may be complementary values that express the likelihood that a user is undergoing, or will undergo, a negative experience. For example, likelihood value 210 may be 0.7, indicating a 70% likelihood that a user is undergoing, or will undergo, a negative experience. In that example, likelihood value would be 0.3, indicating a 30% likelihood that a user is not undergoing a negative experience.

In some embodiments, neural network 208 may only output one of likelihood values 210 and 212. For example, in some instance it may be beneficial to only output the likelihood value that expresses the likelihood that a user will undergo a negative experience. In such an example, a decision of whether to alter the parameters of the user experience may be made based only on the output likelihood value.

In some other embodiments, neural network 208 may make multiple likelihood predictions. For example, neural network 208 may not only predict the likelihood that a user is currently undergoing a negative user experience, but also the likelihood that a user will undergo a negative user experience in the next 10 minutes, and the likelihood that a user will undergo a negative user experience in the next 20 minutes. In such an embodiment, neural network 208 may output a set of values for each prediction (e.g., one likelihood value for the current time, one likelihood value for the next 10 minutes, and one likelihood value for the next 20 minutes).

In FIG. 2, only one neural network 208 is depicted. However, in some embodiments multiple neural networks may be utilized to predict the likelihood that a user is currently undergoing or will undergo a negative user experience. For example, a first neural network may be utilized to predict the likelihood that a user is currently undergoing a negative user experience. A second neural network may be utilized to determine whether a user is likely to undergo a negative user experience at some point in the future. In some such embodiments, for example, a unique neural network may be utilized for each point in time for which a prediction is made.

In some embodiments, the output or outputs of neural network 208 may be compared to a threshold value. For example, likelihood value 210 may be compared to a negative-experience threshold to determine whether the likelihood of a user undergoing a negative experience his high enough to merit altering a modifiable parameter of the user's computer-implemented environment.

In some embodiments, the parameters of a computer-implemented environment may be altered at random when it is predicted that a user is likely to be undergoing (or will undergo) a negative experience. However, in some embodiments the particular parameters to be altered may be chosen based on an efficacy analysis. For example, in some embodiments a neural network may determine that the user is undergoing a negative experienced based on simplified frequency data that pertains to visual metrics (e.g., metrics relating to a user's pupil size or length of eye gaze). In those embodiments, the parameters that may be selected for alteration may be limited to, or focused on, parameters that pertain to the user's vision (e.g., brightness of the room, colors on display, and font size).

In some embodiments, the alteration of the environmental-parameter values for a particular user may be based on the environmental-parameter values of users who are similar to the particular user. For example, the values of the modifiable parameters for the particular user's environment may be altered to resemble the parameters of at least one similar user's environment.

Figure 3:
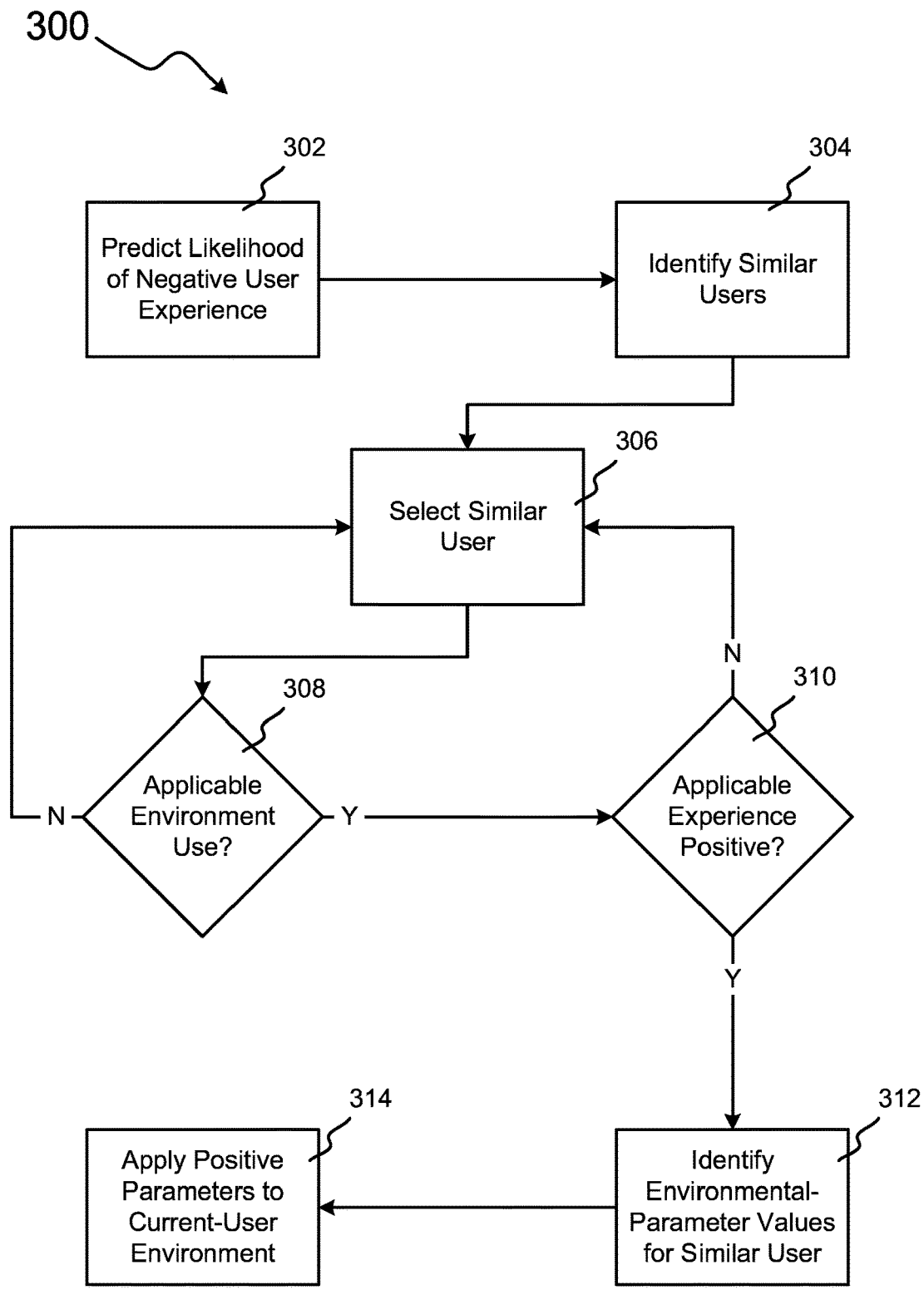
FIG. 3 illustrates an example method of altering the environmental-parameter values of a particular user based on the environmental-parameter values of a similar user, in accordance with embodiments.

FIG. 3 illustrates one method 300 of altering the environmental-parameter values of a particular user based on the environmental-parameter values of a similar user. In method 300, a computer system that is implementing the particular user's computer-implemented environment may have access to data pertaining to users similar to the particular user. Further, the computer system may have access to data pertaining to computer-implemented environments to which that similar user has access or has previously used, whether that use resulted in a positive experience for the similar user, and the environmental-parameter values associated with that use. In some embodiments, data pertaining to a similar user's use of computer-implemented environments may pertain to past activity of the similar user. In other embodiments, the data pertaining to a similar user's user of computer-implemented environments may pertain to a use by the similar user that is simultaneous to the particular user's use of the particular user's computer-implemented environment (e.g., occurring in real time).

In block 302, a likelihood of a negative user experience of a particular user is predicted. In some embodiments, the prediction in block 302 may be a prediction of a current negative user experience, and in some embodiments the prediction in block 302 may refer to a future negative user experience. In some embodiments, the prediction in block 302 may be a prediction of either a current or a future negative user experience, depending on the circumstances.

Upon prediction of a negative user experience of a particular user, users similar to the particular user are identified in block 304. Similar users may be identified in several different ways. For example, in some embodiments the particular user may have a profile registered with the computer system that is implementing the computer-implemented user experience (e.g., the particular user may have a profile registered on a website). In such embodiments, the particular user's profile may provide information that may be correlated with the particular user's preferences regarding environmental parameters of computer-implemented environments. This information may then be compared to the profiles of other users in an attempt to locate users with similar preferences regarding environmental parameters.

In other embodiments, the particular user may not have a profile registered with the computer system that is implementing the computer-implemented experience. However, the computer system may have access to profiles belonging to the particular user, or information pertaining to the particular user, from other sources. For example, in some embodiments the computer system may have access to social media profiles and posts that may provide information about the likely preferences of the particular user.

In some embodiments, whether a second user is "similar" to the particular user may be a threshold determination. For example, a particular user's preferences regarding environmental parameters may expressed as a set of values, or a range of values, for each environmental parameter. In these embodiments, a second user may be "similar" to the particular user if that second user's values or range of values is within a threshold deviation percentage from the particular user's values or range of values.

A single similar user of the identified similar users is selected in block 306. In some embodiments, this selection may occur arbitrarily (e.g., in alphabetical order of real names or profile names). In other embodiments, this selection may occur based on the extent to which the similar user is similar to the particular user (e.g., the similar user whose predicted preferences deviate the least from the particular user's predicted preferences would be selected first).

In block 308, it is determined whether the selected similar user's use of a computer-implemented environment is applicable to the particular user's computer-implemented environment. A similar user may be considered to have applicable environment history if the similar user's list of modifiable parameters for a computer-implemented environment are similar to, or the same as, the modifiable parameters of the particular user for the particular user's computer-implemented environment. In other words, a similar user's environment may be considered applicable to the particular user's environment if the parameters that control the similar-user's experience of the environment could also control the particular user's experience in a similar way if applied to the particular user's environment. For example, a similar user's environment may be applicable if it includes a computer monitor that has the same control parameters for resolution, brightness, and contrast settings as the particular user's computer monitor. The similar user's environment may also be applicable if it includes an augmented-reality headset that has the same opacity and color settings as the particular user's augmented-reality headset. The similar user's environment may also be applicable if it is an augmented-reality room that has the same number of dimmable lights in the same locations as the particular user's augmented-reality room.

In some embodiments the list of modifiable parameters for the similar user's applicable environment is the same as the list of modifiable parameters for the particular user's environment. In other words, in those embodiments, the same parameters that may be changed to alter the environment of the similar user may be changed to alter the environment of the particular user in the same way. This may occur, for example, if the similar user's applicable environment and the particular user's environment are the same website shown on the same browser, the same program displayed through the same model of augmented-reality device, or the same configuration of augmented-reality room. This may also occur in instances in which the similar user's applicable environment and the particular user's environment are the same exact environment being used by the users at separate times. This may also occur, for example, if an augmented-reality room is hosted for multiple users at a theme park, or if products such as virtual-reality headsets are being demonstrated for multiple users at an electronics retail store.

In other embodiments the list of modifiable parameters between the two environments may differ, but the overall effect of an alteration of the values for one parameter (or a set of parameters) in the similar user's environment may be approximated in the particular user's environment by altering the values for similar parameters.

In some embodiments, whether a similar user has applicable environment use may depend on whether the similar user has exhibited similar user-metric frequency patterns as the particular user in a computer-implemented environment. For example, if the particular user is undergoing a negative experience because a computer-implemented environment is too loud, the particular user may exhibit a particular pattern in the particular user's user-metric frequency data. Whether a similar user has applicable environment use, then, may depend on whether that similar user also has exhibited that particular pattern in the similar user's user-metric frequency data. In these embodiments, whether the modifiable parameters of the similar user's environment are similar to or identical to the modifiable parameters of the particular user's environment may also be included in the determination of whether a user is similar to the particular user.

In some embodiments, data pertaining to the similar user's environment may be found in a database maintained by the computer system that implements the computer-implemented environment. For example, the profile of the similar user may include a list of computer-implemented environments to which that similar user has access or that that similar user has used, and the list of modifiable parameters in those modifiable environments.

If the similar user is currently using an applicable computer-implemented environment, the data of similar user may be found by obtaining the current data of the similar user's environment (e.g., the environmental-parameter values, the similar user's measurement metrics). In other words, applicable environment use may be found in block 308 where the similar user is using an applicable computer-implemented environment at the same time as the particular user.

If no applicable environment is identified in block 308, the next similar user is selected in block 306, and block 308 is repeated for that next similar user. Once a similar user with an applicable environment is selected, a determination is made in block 310 whether that similar user has undergone or is undergoing a positive experience in that applicable environment. The data related to whether a similar user has undergone (or is undergoing) a positive user experience may be similar to the data used to predict the likelihood of a negative user experience for the particular user. For example, in some embodiments a method similar to method 100 may also be performed with regard to the similar user's experience in the similar user's environment. In those embodiments, data from that method may be available to the computer system that is implementing the particular user's environment.

In some embodiments, whether a similar user has exhibited a positive applicable experience may depend on whether the patterns in the similar user's user-metric frequency data transition from patterns that are associated to a negative experience to patterns that are not associated with a negative experience. This may be particularly useful in embodiments in which a similar user's environmental use is determined to be applicable based in part on the similar user exhibiting the same or similar patterns in user-metric frequency data as the particular user. For example, the particular user and a similar user may both exhibit a pattern (or patterns) in their user-metric frequency data that is associated with a likelihood of a negative experience ten minutes after the pattern occurs. In that example, the similar user may be considered to have exhibited an applicable positive experience if that similar user did not actually have a negative experience at the conclusion of that ten-minute period (e.g., if parameter values for the similar user were changed, causing the negative experience to be avoided). In other instances, the pattern exhibited by the particular user and the similar user may be associated with a current negative experience. In those instances, the similar user may be considered to have exhibited an applicable positive experience if the similar user's pattern transitioned to a pattern not associated with a negative user experience.

In instances in which the similar user is not using the applicable environment at the same time as the particular user, data related to the similar user's past use of the environment may be utilized. For example, if a method similar to method 100 was performed with regard to the similar user's experiences, the result of that method may have been recorded on a database available to the computer system that is implementing the particular user's environment.

In some instances in which the similar user is using the applicable environment at the same time as the particular user, the similar user's current experience data may be more available to the computer system that is implementing the particular user's environment, or may be more relevant to the particular user's experience. For that reason, in some embodiments block 310 may determine whether the similar user is currently undergoing a positive experience before attempting to identify or obtain historical data for the similar user's experience. If the similar user is not currently undergoing a positive experience, block 310 may utilize data related to the similar user's past use of the applicable environment.

If the similar user has not undergone and is not undergoing a positive experience in that applicable environment, or if no data is available related to the similar user's positive experience, the next similar user is selected in block 306, and block 308 and block 310 are repeated for that next similar user.

Once applicable environment history and data relating to a positive experience for a similar user is found, the environmental-parameter values that correspond to that similar user's positive experience are identified in block 312. In some embodiments, for example, the value for every modifiable parameter related to the similar user's environment may be identified at block 312. In other embodiments, only the values for the environmental parameters that exactly correspond to environmental parameters in the particular user's environment may be identified. This may occur, for example, where the particular user's environment lacks some customization features that are present in the similar user's environment.

In some embodiments, only environmental-parameter values that appear to be associated with a similar user's positive user experience may be identified in block 312. This may be particularly useful, for example, in embodiments in which the similar user's environmental use is determined to be applicable based in part on the similar user exhibiting the same or similar patterns in user-metric frequency data as the particular user, and the similar user was determined to have exhibited a positive applicable experience based on whether those patterns transitioned from patterns that are associated with a negative experience to patterns that are associated with a positive experience. In these embodiments, identifying the parameters of the similar user's environment that were modified, or that otherwise deviated from the particular user's parameters and altering the particular user's parameters based on that identification may increase the likelihood that the alteration of the user's parameters recreates the positive user experience of the similar user.

In some embodiments, only environmental-parameter values that appear to be associated with the particular user's negative experience may be identified in block 312. For example, the particular user's negative experience may appear to be associated with room temperature. In that example, only values pertaining to environmental parameters that control the climate of the similar user's environment may be identified.

After the similar user's environmental-parameter values are identified in block 312, the identified environmental-parameter values are applied to the particular user's environment in block 314. In some embodiments, this may involve overwriting every environmental-parameter value of the particular user's environment with a corresponding parameter value from the similar user's environment. However, in some instances changing every environmental-parameter value for the particular user may result in such a significant change that the particular user's overall experience is negatively affected.

Thus, in some embodiments only a partial portion of the environmental-parameter values may be copied from the similar user's environment to the particular user's environment. For example, in some embodiments only copy parameter values for environmental parameters that appear to be relevant to the similar user's positive experience may be copied in block 314. In other embodiments, only parameter values for environmental parameters that appear to be relevant to the particular user's negative experience may be copied in block 314.

In some embodiments, however, identifying the environmental parameters that appear to be relevant to the similar user's positive experience or the particular user's negative experience may be computationally intensive. Further, such identification may not be necessary, in some cases, to improve the experience of the particular user. Thus, in some embodiments, the partial portion of the environmental-parameter values to be copied from the similar user's environment may be selected randomly, semi-randomly, or arbitrarily.

Figure 4A:
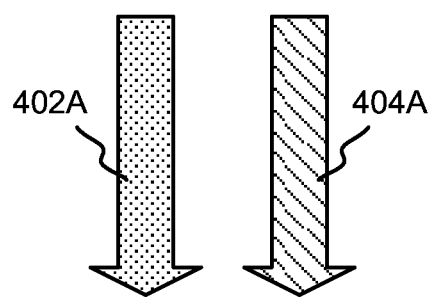
FIG. 4A illustrates a visual depiction of two lists of modifiable parameter values for computer-implemented environments, in accordance with embodiments.
Figure 4B:
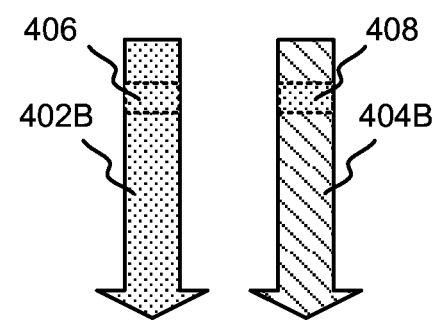
FIG. 4B represents a first list of modifiable parameter values after a contiguous set of modifiable parameter values from a second list is copied to the first list, in accordance with embodiments.
Figure 4C:
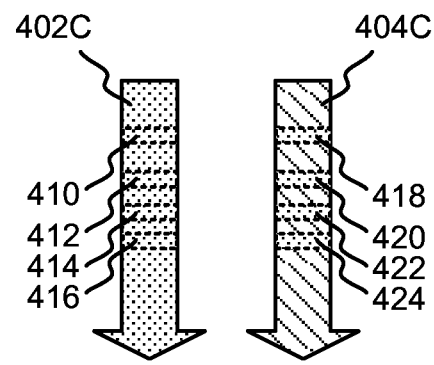
FIG. 4C represents a first list of modifiable parameter values after several non-contiguous sets of modifiable parameter values from a second list are copied to the first list, in accordance with embodiments.

FIGS. 4A-4C illustrate several examples of copying the environmental-parameter values from a similar user's environment to a particular user's environment. In FIGS. 4A-4D, the lists of environmental-parameter values for each user are displayed as vectors. In some embodiments, these vectors may take the form of a single-row (or column) matrix, with the number of columns (or rows) being determined by the number of modifiable parameter values. In other embodiments, these vectors may take the form of a multiple-row, multiple-column matrix, in which metadata pertaining to each environmental-parameter value (e.g., a parameter label) may be included.

For example, in FIG. 4A, dotted vector 402A may represent the list of modifiable parameter values for a similar user, and striped vector 404A may represent the list of modifiable parameter values for a particular user. Vectors 402A and 404A in FIG. 4A represent vectors before environmental-parameter values are copied from vector 402A to vector 404A. In some embodiments, the parameter value at any point of vector 402A may correspond to a value for an analogous (or the same) parameter at that point on vector 404A. For example, if a parameter located 25% from the top of vector 402A coded for the frequency with which the panel of the similar user's LCD monitor refreshed (i.e., the refresh rate), the parameter located 25% from the top of vector 404A would code for the refresh rate of the particular user's monitor.

FIG. 4B represents one example method by which parameter values may be copied from vector 402A to vector 404A. Vectors 402B and 404B are illustrated with parameter values that were copied from vector 402B to vector 404B emphasized with a dashed outline. Section 406 of vector 402B represents the parameter values that were copied to vector 404B. Section 408 of vector 404B is shown with the dotted fill pattern of vector 402B, indicating that the parameter values therein have been copied from section 406. The parameter values in section 406 may have been selected because they were determined to be likely to be related to the similar user's positive experience, or because the corresponding parameter values in vector 404B were determined to be likely to be related to the particular user's negative experience. In some instances, the values of section 406 may have been selected arbitrarily. For example, the computer system implementing the particular user's experience may have historical data to suggest that the particular user becomes frustrated when over 5% of his or her environment changes suddenly. The computer system may have, therefore, selected a section of contiguous parameters on vector 404B that represent 5% of the particular user's experience (e.g., 5% of vector 404B), and copied the parameter values from the corresponding parameters on vector 402A.

In some embodiments, the parameter values in vector 404A that are replaced may not be contiguous. FIG. 4C illustrates such a situation. In FIG. 4C, sections 410-416 of vector 402C may represent section 406 of vector 402B, and sections 418-424 of vector 404C may represent section 408 of vector 404B. In FIG. 4C, therefore, the values of the same percentage of parameters of the particular user's vector may be replaced as in FIG. 4B. However, in FIG. 4C, the parameters may be spread throughout vector 404C. As in FIG. 4B, the specific parameters chosen may be purposefully selected, or may be selected arbitrarily.

Many embodiments of the present disclosure thus far illustrated have presented methods by which to mitigate, cease, or prevent negative user experiences. However, some embodiments of the present disclosure may be utilized for improving a user experience even when a negative user experience is predicted to be unlikely. This may be useful, for example, to prevent a computer-implemented environment from becoming boring, or to discover new combinations of environmental-parameter values that may lead to user experiences that are as positive, or more positive, than previous combinations of environmental-parameter values.

Figure 5:
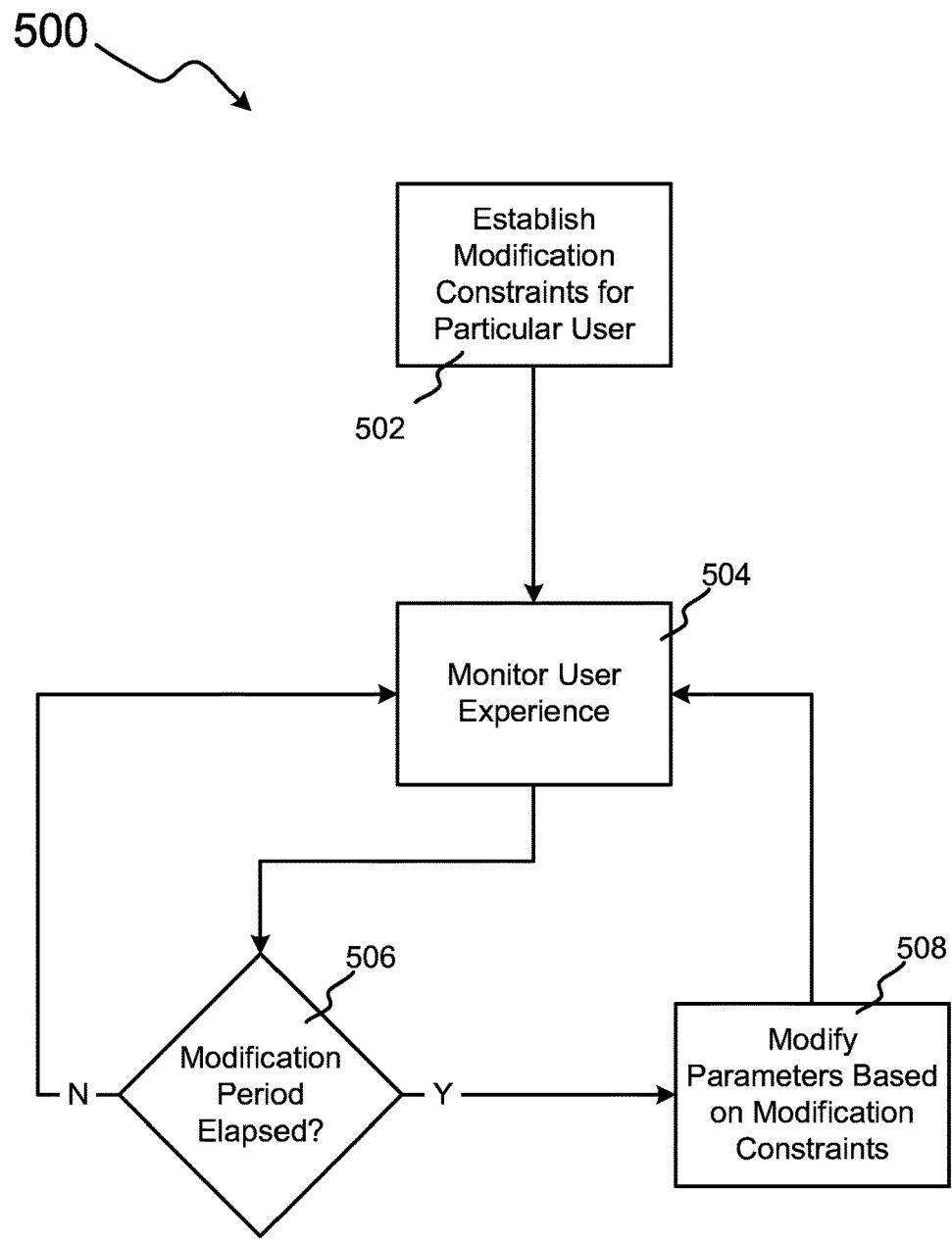
FIG. 5 illustrates an example method for periodically altering the parameters of a computer-implemented environment, in accordance with embodiments.

FIG. 5 illustrates one example of a method 500 for periodically altering the parameters of a computer-implemented environment. In block 502, modification constraints for a particular user are established. The modification constraints may be established to restrict regular changes (or lack thereof) to the particular user's environment that may be likely to regularly result in a negative experience for that user. Examples of potential modification restraints may be modification period, modification magnitude, modification concentration, and modification sensitivities.

The modification period may represent a cyclic period of time that represents a particular user's tolerance for changes in the particular user's environment. For example, if the modification period were 5 minutes, and changes were implemented in the environment every 4 minutes, the particular user may dislike the changes because of how often they occur, even if the changes would otherwise lead to a more positive experience for the particular user. If, on the other hand, changes were implemented in the environment every 6 minutes, the user may become bored in the environment more easily because of how infrequently the environment changes.

The modification magnitude may be a numerical representation of the tolerance a particular user has for changes in environmental parameters at each modification period. For example, if the modification period for a particular user is set to 15 minutes, the modification magnitude for that user may be 5%. In other words, every 15 minutes, the environmental-parameter values for that particular user's environment may change by 5%. In some instances, this may be to prevent regular environmental changes of too high of a magnitude, which may frustrate some users. In other instances, this may be to prevent regular environmental changes of too low of a magnitude, causing potential positive effects on the user's experience by the regular changes to go unrealized. In some instances, this magnitude may be calculated by combining the percentage by which each environmental-parameter value for that user's experience is altered. For example, if a first parameter value is changed by 2%, and a second parameter value is changed by 3%, the total modification magnitude may be 5%.

Modification concentration may be a representation of how sensitive to or appreciative of a particular user is with regard to multiple aspects of the user's environment changing simultaneously. For example, some users may react particularly well to high modification magnitudes where those magnitudes are concentrated in only a few changes, but become frustrated when expected to adjust to several types of changes simultaneously. Similarly, some users may become frustrated when they notice large changes to the environment, but react well to large aggregate changes, where those changes are spread out through a high number of parameters.

Modification sensitivities may be certain parameters that a particular user either does not appreciate being changed, or does not appreciate staying the same. For example, a particular user may typically react negatively when the volume of an environment is changed, but typically react positively when the colors of the environment is changed. However, a second user may prefer changes to volume over any visual changes. Modification sensitivities may therefore take the form of a metadata flag applied to parameters to prevent their selection for modification too frequently or infrequently, or at too high of magnitudes or too low of magnitudes.

In some embodiments, all modification constraints may act as weights against the other modification constraints. For example, a particular user may not react negatively to changes of tremendously high frequency as long as those changes are of a low enough magnitude, or spread throughout a high enough number of parameters. Thus, for that user, the modification period may be weighted by the modification magnitude or modification concentration. Similarly, a particular user may react negatively to visual changes above a certain magnitude, but react positively to proprioceptive changes far greater than that certain magnitude. Thus, for that user, the modification magnitude may be weighted by the modification sensitivity.

The modification constraints may be established in several ways. In some embodiments, the modification constraints may be discernable from data available on the particular user's prior negative experiences. For example, through the methods illustrated in this disclosure (e.g., method 100), a first pattern may be evident: that a particular user begins to undergo a negative experience in a particular computer-implemented environment approximately every 30 minutes. That pattern may suggest that a user gets bored every 30 minutes if all parameters in the environment are static. Further, a second pattern may be evident: that the particular user has never reacted positively to a change in his or her environment that occurred within 10 minutes of a previous change in the environment. That may suggest that the particular user gets frustrated if he or she does not have at least 10 minutes to adjust to environmental changes. From these two patterns, the modification period for the particular user could be set between 10 and 30 minutes.

In some embodiments, the modification constraints for a particular user may be set through trial and error. For example, a computer system may go through a calibration period, during which the environment is changed periodically, and the user response measured. Occasionally, the combination of modification constraints may be altered, and the user response may continue to be measured. Eventually, the user response may be consistently negative, indicating that one or more of the modification constraints are not avoiding changes to which the user is reacting negatively. Similarly, if the user consistently undergoes a negative experience before the environment is changed, it may indicate that the modification constraints are not changing the environment in a way that prevents the user growing bored.

Once the particular user's modification constraints are established in block 502, the particular user's experience is monitored, in block 504, by the computer system that implements the environment. In some embodiments, this may involve monitoring user-metric frequency data (e.g., directly, such as by monitoring user actions, or indirectly, such as by monitoring the results of user actions), simplifying that data, and extracting user-experience values from the simplified data, consistent with the embodiments provided herein.

As the particular user uses the environment, the modification cycle runs according to the modification period. Thus, as the computer system determines, in block 506 and while monitoring the user experience, whether the modification period has elapsed. If the modification period has not elapsed, the computer system continues to monitor the user experience in block 504. However, if the modification period has elapsed, the computer system modifies, in block 508, the parameters for the computer-implemented experience based on the modification constraints.

In some embodiments, method 500 may also include determining whether the modification in block 508 resulted in a negative change to the user experience or a positive change to the user experience. In such embodiments the computer system may utilize user-metric frequency data that is monitored in block 504, simplified (e.g., through a convolutional neural network), and extracted to a user-experience value (e.g., through a predictive neural network) to determine whether the modification in block 508 was successful. This result may then be used to adjust the modification constraints accordingly.

In some embodiments, method 500 may be performed while also attempting to mitigate and prevent negative user experiences, such as by method 100. In those embodiments, the extracted user-experience values as part of block 504 may be utilized to continuously predict whether it is likely that a user is or will be undergoing a negative user experience. Where the monitoring in block 504 predicts a likelihood of a negative user experience, the actions of blocks 506 and 508 may be interrupted, and the user's experience may be monitored by, for example, identifying a similar user with a positive experience in an applicable environment and altering the particular user's parameters based on that similar user's parameters. At that point modification of the user's environment based on the modification period and other constraints may resume.

Some embodiments of the present disclosure have been discussed in relation to an augmented-reality room. In some embodiments, such a room may include virtual elements, such as a monitor that is operated by a computer (e.g., for word processing and internet browsing) and real elements, such as lights, climate controls (e.g., heating, cooling, and air conditioning), audio, and others.

Figure 6:
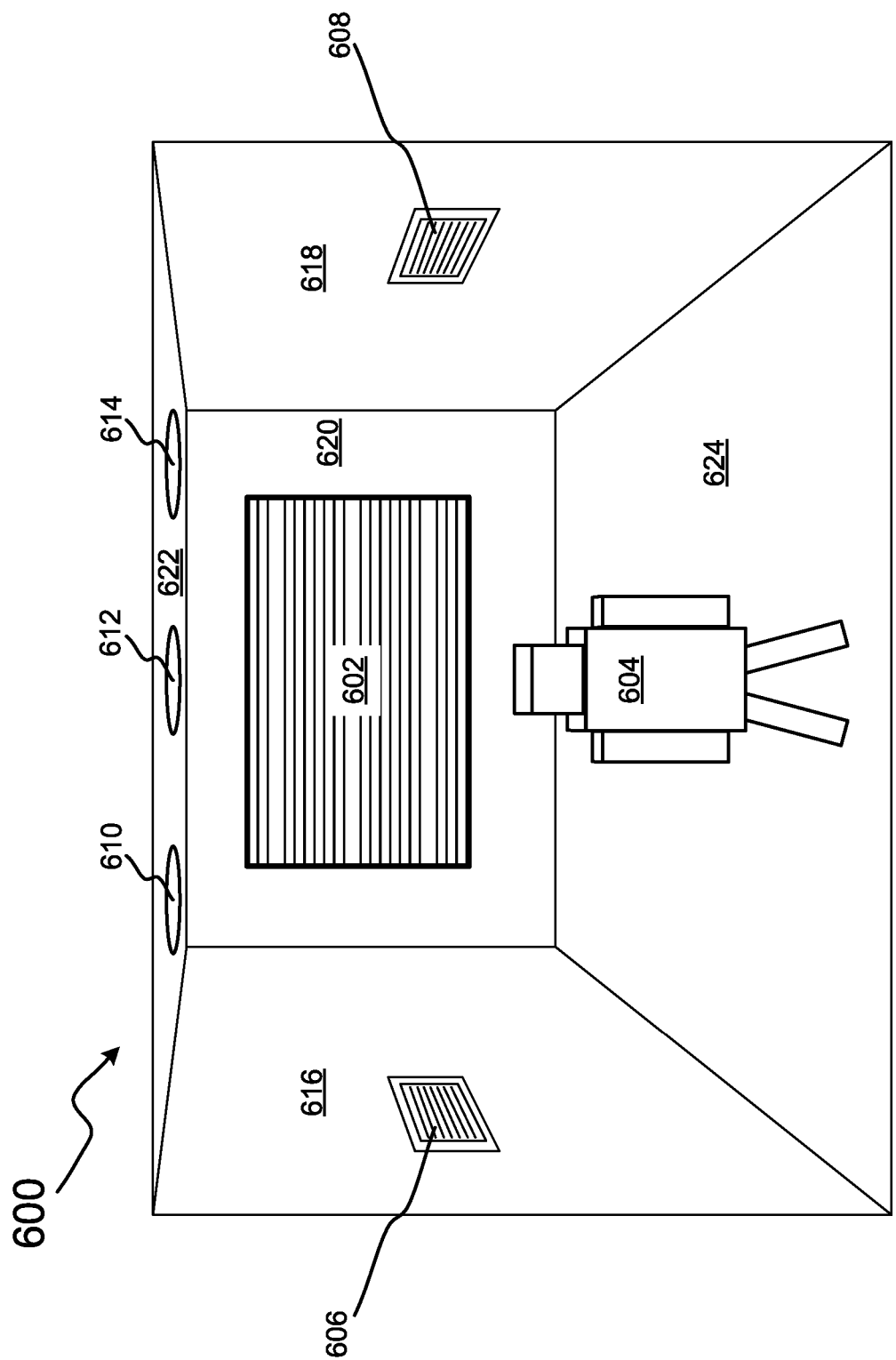
FIG. 6 provides an example illustration of an augmented-reality room that may be configured for a user in accordance with embodiments.

FIG. 6 provides an example illustration of an augmented-reality room 600. Room 600 contains a computer monitor 602. Computer monitor 602 may be operated by user 604. User 604 may utilize computer monitor 602 for the purposes of general computer use, such as viewing internet-connected content (e.g., visiting retail websites, viewing emails and instant messaging, and viewing live-streamed events), playing games, reading, and others. In some embodiments computer monitor 602 may be embedded into a headset worn by the user, such as an augmented-reality headset.

Room 600 contains ventilation sources 606 and 608, which may be capable of increasing or decreasing the temperature in room 600, as well as creating airflow for reasons of comfort or simulation (e.g., simulating outdoor environments). For example, the temperature of air dispensed by ventilation sources 606 and 608 may be configurable, as may be the amount of air dispensed (e.g., the volume of air dispensed over time). In some embodiments, ventilation sources 606 and 608 may be controlled as a group, or may be independently configurable. In some embodiments, further ventilation sources may be present throughout room 600.

Room 600 also contains lights 610, 612, and 614. In some embodiments lights 610-614 may be any light source consistent with the embodiments of this disclosure, such as incandescent lights, fluorescent lights, ultraviolet lights, and infrared heat lights. In some embodiments, the intensity, brightness, tone, flicker frequency, and other properties of lights 610-614 may be configurable. In some embodiments, lights 610-614 may be may be controlled as a group, or may be independently configurable. In some embodiments, further light sources may be present throughout room 600.

Room 600 contains walls 616, 618, and 620, ceiling 622, and floor 624. In some embodiments walls 616-620, ceiling 622, and floor 624 may be equipped with large displays that are configurable. For example, in some embodiments the entire portion of walls 616-620, ceiling 622, and floor 624 may be displays capable of displaying text, pictures, or colors. In some embodiments, configuring the appearance of walls 616-620, ceiling 622, and floor 624 may prevent user 604 from getting bored with the appearance of room 600, and may also help to simulate different environments.

Room 600 may also contain with equipment to provide user 604 with audio feedback (e.g., speakers), haptic feedback, and proprioceptive feedback. In some embodiments, other room-configuration and user-feedback mechanisms may also be included in room 600. In some embodiments, room 600 may also contain equipment for monitoring the frequency of user metrics. For example, in some embodiments room 600 may be equipped with cameras capable of monitoring user 604's body language and facial expression. Room 600 may also be equipped with one or more microphones capable of monitoring user 604's speech patterns, and infrared temperature sensors for monitoring user 604's skin temperature.

In some embodiments, all of computer monitor 602, ventilation sources 606 and 608, lights 610-614, walls 616-620, ceiling 622, floor 624, and any other room-configuration and user-feedback mechanisms may be configurable by a computer system that is implementing the environment of room 600 for user 604. In some embodiments, this computer system may practice methods such as method 100 to predict the likelihood of negative user experiences for user 604 in room 600, and to mitigate or prevent those negative experiences. This computer system may also practice methods such as method 300 for altering the modifiable parameters of all configurable computer monitor 602, ventilation sources 606 and 608, lights 610-614, walls 616-620, ceiling 622, floor 624, and any other room-configuration and user-feedback mechanisms in room 600. Further, the computer system may also practice methods such as method 500 for evolving the experience of user 604 in room 600.

In some embodiments, the configurable components of room 600 may be grouped into separate sub environments, which may be controlled separately (e.g., by separate computer systems or by the same computer systems but independently of each other). For example, in some embodiments computer monitor 602 and associated audio may be a first sub environment. A first predictive neural network may predict the likelihood of a negative experience with regard to this first sub environment, and control the content displayed by computer monitor 602 (and, for example, any associated audio) to mitigate and prevent those negative experiences (including periodically altering the parameters of the sub environment).

In these embodiments, ventilation sources 606 and 608, lights 610-614, walls 616-620, ceiling 622, and floor 624 may be a second sub environment. A second predictive neural network may predict the likelihood of a negative experience with regard to this second sub environment, and may configure the parameter values that control any or all of ventilation sources 606 and 608, lights 610-614, walls 616-620, ceiling 622, and floor 624 to mitigate and prevent those negative experiences. In other words, the environment of room 600 may be composed of several sub environments, and for each sub environment, separate instances of methods similar to method 100, 300, and 500 may be occurring simultaneously. In some embodiments, these separate instances may be separately controlled (e.g., through separate computer systems and neural networks). In other embodiments these separate instances may be controlled by one computer system and one neural network (or multiple neural networks), but the continual development of the sub environments by the processes discussed within this disclosure may be separated by that computer system.

As used herein, the term "neural network" may refer to an aggregate neural network that comprises multiple sub neural networks, or a sub neural network that is part of a larger neural network. Where multiple neural networks are discussed as somehow dependent upon one another (e.g., where one neural network's outputs provides the inputs for another neural network), those neural networks may be part of a larger, aggregate neural network, or they may be part of separate neural networks that are configured to communicate with one another (e.g., over a local network or over the internet).

Figure 7:
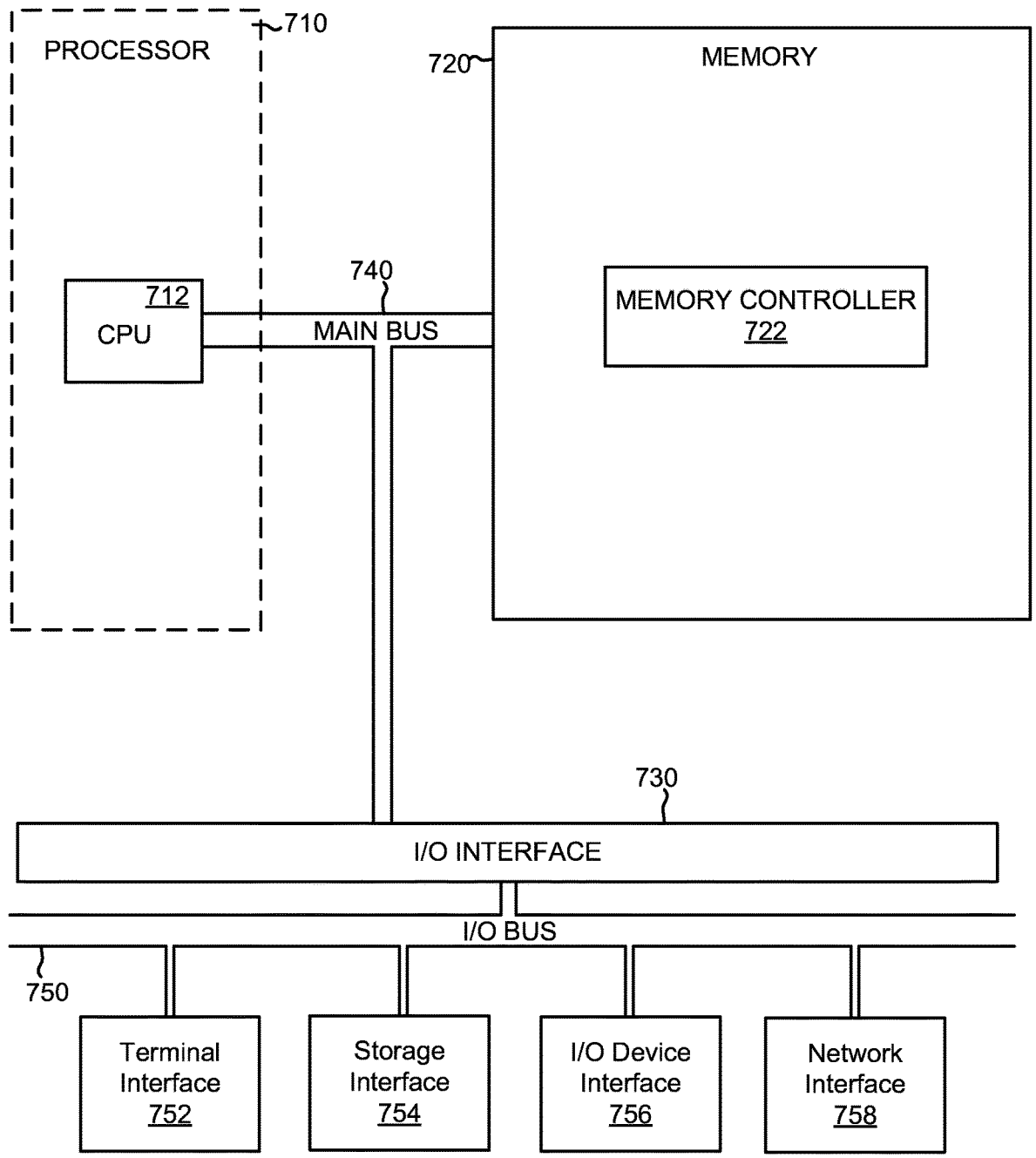
FIG. 7 depicts the representative major components of a computer system that may be used in accordance with embodiments.

FIG. 7 depicts the representative major components of an exemplary Computer System 701 that may be used in accordance with embodiments of the present disclosure. The particular components depicted are presented for the purpose of example only and are not necessarily the only such variations. The Computer System 701 may comprise a Processor 710, Memory 720, an Input/Output Interface (also referred to herein as I/O or I/O Interface) 730, and a Main Bus 740. The Main Bus 740 may provide communication pathways for the other components of the Computer System 701. In some embodiments, the Main Bus 740 may connect to other components such as a specialized digital signal processor (not depicted).

The Processor 710 of the Computer System 701 may be comprised of one or more CPUs 712. The Processor 710 may additionally be comprised of one or more memory buffers or caches (not depicted) that provide temporary storage of instructions and data for the CPU 712. The CPU 712 may perform instructions on input provided from the caches or from the Memory 720 and output the result to caches or the Memory 720. The CPU 712 may be comprised of one or more circuits configured to perform one or methods consistent with embodiments of the present disclosure. In some embodiments, the Computer System 701 may contain multiple Processors 710 typical of a relatively large system. In other embodiments, however, the Computer System 701 may be a single processor with a singular CPU 712.

The Memory 720 of the Computer System 701 may be comprised of a Memory Controller 722 and one or more memory modules for temporarily or permanently storing data (not depicted). In some embodiments, the Memory 720 may comprise a random-access semiconductor memory, storage device, or storage medium (either volatile or nonvolatile) for storing data and programs. The Memory Controller 722 may communicate with the Processor 710, facilitating storage and retrieval of information in the memory modules. The Memory Controller 722 may communicate with the I/O Interface 730, facilitating storage and retrieval of input or output in the memory modules. In some embodiments, the memory modules may be dual in-line memory modules.

The I/O Interface 730 may comprise an I/O Bus 750, a Terminal Interface 752, a Storage Interface 754, an I/O Device Interface 756, and a Network Interface 758. The I/O Interface 730 may connect the Main Bus 740 to the I/O Bus 750. The I/O Interface 730 may direct instructions and data from the Processor 710 and Memory 720 to the various interfaces of the I/O Bus 750. The I/O Interface 730 may also direct instructions and data from the various interfaces of the I/O Bus 750 to the Processor 710 and Memory 720. The various interfaces may comprise the Terminal Interface 752, the Storage Interface 754, the I/O Device Interface 756, and the Network Interface 758. In some embodiments, the various interfaces may comprise a subset of the aforementioned interfaces (e.g., an embedded computer system in an industrial application may not include the Terminal Interface 752 and the Storage Interface 754).

Logic modules throughout the Computer System 701—including but not limited to the Memory 720, the Processor 710, and the I/O Interface 730—may communicate failures and changes to one or more components to a hypervisor or operating system (not depicted). The hypervisor or the operating system may allocate the various resources available in the Computer System 701 and track the location of data in Memory 720 and of processes assigned to various CPUs 712. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   monitoring, by a processor, frequency data related to a user metric of a first user during a measurement window, wherein the user metric is related to the first user's use of a first computer-implemented environment;
   monitor frequency data related to the first user metric of the first user during a second measurement window;
   express the frequency data related to the first user metric as a first spectrogram;
   input the first spectrogram into a first convolutional neural network;
   simplifying, by the first convolutional neural network, the frequency data related to the user metric, resulting in a set of simplified frequency data, wherein the simplifying comprises deriving patterns in the frequency data over the measurement window;
   inputting, by the processor, the set of simplified frequency data into a predictive neural network;
   monitor frequency data related to the first user metric of the first user during a second measurement window;
   express the frequency data related to the first user metric during the second window as a second spectrogram;
   input the second spectrogram into the first convolutional neural network;
   simplify, by the first convolutional neural network, the frequency data related to the first user metric during the second measurement window, resulting in a second set of simplified frequency data; and
   input the second set of simplified frequency data into the predictive neural network;
   determining, by the predictive neural network and based on the first set of simplified frequency data and the second set of simplified frequency data, a likelihood of a negative user experience for the first user; and
   altering, by the processor and based on the likelihood, a parameter of the first user environment.

2. The method of claim 1, wherein the altering comprises:
   identifying, by the processor, a first list of parameter values of the first computer-implemented environment;
   identifying, by the processor, a second user, comprising:
      determining that the second user has experience in a second computer-implemented environment that is applicable to the first computer-implemented environment; and
      identifying a positive experience of the second user in the second computer-implemented environment;
   identifying, by the processor, a second list of parameter values of the second computer-implemented environment corresponding to the second user; and
   copying, by the processor, a first parameter value from the second list of parameter values to the first list of parameters values.

3. The method of claim 2, further comprising:
   identifying, by the processor, properties of a first profile that is associated with the first user;
   identifying, by the processor, properties of a second profile that is associated with the second user; and
   identifying, by the processor, a similarity between the first profile and the second profile.

4. The method of claim 2, wherein the determining is based in part on the second computer-implemented environment having a list of modifiable parameters that is identical to a list of modifiable parameters for the first computer-implemented environment.

5. The method of claim 1, further comprising establishing modification constraints for the first user, and wherein the altering comprises:
   determining that the first user is not likely to undergo a negative experience;
   detecting the end of a modification period for the first user; and
   modifying the parameters of the first computer-implemented environment based on the modification constraints.

6. The method of claim 5, wherein the modification constraints comprise a constraint on modification concentration.

7. The method of claim 1, wherein the first computer-implemented environment comprises a first sub environment and a second sub environment, and wherein the altering affects the first sub environment and the second sub environment independently.

8. A system comprising:
   a processor; and
   a memory in communication with the processor, the memory containing program instructions that, when executed by the processor, are configured to cause the processor to perform a method, the method comprising:
      monitoring frequency data related to a first user metric of a first user during a measurement window, wherein the first user metric is related to the first user's use of a first computer-implemented environment;
monitor frequency data related to the first user metric of the first user during a second measurement window;
expressing the frequency data related to the first user metric as a first spectrogram;
express the frequency data related to the first user metric during the second window as a second spectrogram;
inputting the first spectrogram into a convolutional neural network;
input the third spectrogram into the convolutional neural network;
simplifying, by the convolutional neural network, the frequency data related to the first user metric, resulting in a first set of simplified frequency data;
simplify, by the convolutional neural network, the frequency data related to the first user metric during the second measurement window, resulting in a second set of simplified frequency data; and
inputting the first set of simplified frequency data into a predictive neural network;
input the second set of simplified frequency data into the predictive neural network;
determining, by the predictive neural network and based on the first set of simplified frequency data and second set of simplified frequency data, a likelihood of a negative user experience for the first user; and
altering, based on the likelihood, a parameter of the first user environment.

9. The system of claim 8, wherein the determining comprises associating a first pattern in the set of simplified frequency data with a second pattern, and associating the second pattern with a negative user experience.

10. The system of claim 8, wherein the user metric comprises a derivative user metric.

11. The system of claim 10, wherein the derivative user metric is the number of web pages visited over a first period of time.

12. The system of claim 10, wherein the derivative metric comprises the number of times the user submits a command to skip content that is delivered to the user through the first computer-implemented environment over a second period of time.

13. The system of claim 10, wherein the method further comprises
monitoring frequency data related to a second user metric of a first user during a measurement window, wherein the second user metric is related to the first user's use of the first computer-implemented environment;
expressing the frequency data related to the second user metric as a third spectrogram;
inputting the third spectrogram into the convolutional neural network;
simplifying, by the convolutional neural network, the frequency data related to the second user metric, resulting in a third set of simplified frequency data; and
inputting the third set of simplified frequency data into the predictive neural network;
wherein the determining is also based on the third set of simplified frequency data.

14. A computer program product, the computer program product comprising a computer readable storage medium having program instructions embodied therewith, the program instructions executable by a computer to cause the computer to:
monitor frequency data related to a first user metric of a first user during a first measurement window, wherein the first user metric is related to the first user's use of a first computer-implemented environment;
monitor frequency data related to the first user metric of the first user during a second measurement window;
express the frequency data related to the first user metric as a first spectrogram;
express the frequency data related to the first user metric during the second window as a second spectrogram;
input the first spectrogram into a first convolutional neural network;
input the second spectrogram into the first convolutional neural network;
simplify, by the first convolutional neural network, the frequency data related to the first user metric, resulting in a first set of simplified frequency data;
simplify, by the first convolutional neural network, the frequency data related to the first user metric during the second measurement window, resulting in a second set of simplified frequency data; and
input the first set of simplified frequency data and second set of frequency data into a predictive neural network;
determine, by the predictive neural network and based on the first set of simplified frequency data and second set of simplified frequency data, a likelihood of a negative user experience for the first user; and
alter, by the processor and based on the likelihood, a parameter of the first user environment.

15. The computer program product of claim 14, wherein the simplified frequency data comprises a set of decimal values.

16. The computer program product of claim 14, wherein the user first metric comprises the first user's heart rate.

17. The computer program product of claim 14, wherein the user first metric comprises the first user's iris diameter.

18. The computer program product of claim 14, wherein the program instructions also cause the computer to:
monitor frequency data related to a second user metric of the first user during the first measurement window, wherein the second user metric is related to the first user's use of the first computer-implemented environment;
express the frequency data related to the second user metric as a third spectrogram;
input the third spectrogram into a second convolutional neural network;
simplify, by the second convolutional neural network, the frequency data related to the second user metric, resulting in a third set of simplified frequency data; and
input the third set of simplified frequency data into the predictive neural network;
wherein the determining is also based on the third set of simplified frequency data.

* * * * *